US006418234B1

(12) United States Patent
Whited (10) Patent No.: US 6,418,234 B1
(45) Date of Patent: Jul. 9, 2002

(54) SYSTEM AND METHOD FOR STORAGE, RETRIEVAL AND DISPLAY OF INFORMATION RELATING TO SPECIMENS IN MARINE ENVIRONMENTS

(76) Inventor: Keith W. Whited, 420 Huron Ave., Cambridge, MA (US) 02138

( * ) Notice: Subject to any disclaimer, the term of this patent is extended or adjusted under 35 U.S.C. 154(b) by 0 days.

This patent is subject to a terminal disclaimer.

(21) Appl. No.: 09/681,977

(22) Filed: Jul. 2, 2001

Related U.S. Application Data (63) Continuation-in-part of application No. 09/033,892, filed on Mar. 3, 1998, now Pat. No. 6,256,401.
(60) Provisional application No. 60/039,517, filed on Mar. 3, 1997.

(51) Int. Cl.[7] .................................................. G06K 9/00
(52) U.S. Cl. ............................. 382/110; 43/2; 119/215; 382/305; 707/1
(58) Field of Search ................................. 382/110, 100, 382/218, 224, 260, 162, 181, 203, 214, 365, 307; 707/1, 3–5; 379/88.13; 43/1–4; 119/200, 207, 215

(56) References Cited

PUBLICATIONS

Andy Newman, "Those Dimples May Be Digits", newspaper article, Thursday, May 3, 2001, pp. E1, E9, The New York Times, N.Y., N.Y., USA.
Whited, Keith, "The Waikiki Aquarium Shark Cam", www site;http://waquarium.mic.hawaii.edu/coralcam/, Jul. 31, 2001, pp. 1 & 2, Waikiki, USA.

*Primary Examiner*—Jayanti K. Patel
(74) *Attorney, Agent, or Firm*—Mark P. White (57) ABSTRACT

The invention enhances the viewing experience of visitors to marine environments, a specimen is selected by pointing devices near viewing stations 6, 8, 10, 12, 14, having video displays. The specimen is optically scanned, and the video image compared to a database 16 stored within a computer network 2, to which each viewing station is connected. A number of different graphic identification techniques are used to compare the scanned image to the data within the database, including bulk size-shape filtering, color filtering, and pattern analysis. Once the specimen has been identified, the database provides name, habitat, size, habits, diet, history, and other such demographic information to an output device at the viewing station 14 including printers 32. The textual outputs are translated into different languages automatically by computer program methods, in the form of both text and sounds.

7 Claims, 8 Drawing Sheets

FIG. 8

# SYSTEM AND METHOD FOR STORAGE, RETRIEVAL AND DISPLAY OF INFORMATION RELATING TO SPECIMENS IN MARINE ENVIRONMENTS

PROSECUTION HISTORY

This application is a continuation in part of Application Ser. No. 09/033,892, filed on Mar. 3, 1998, now U.S. Pat. No. 6,256,407, and claims priority based on Provisional Application No. 60/039,517 filed on Mar. 3, 1997.

BACKGROUND OF THE INVENTION

1. Field of the Invention

The present invention relates to storage, retrieval, and display of graphical information, and more specifically to such storage, retrieval, and display of such information in connection with identification of specimens in marine environments, including aquaria, lakes, and oceans.

2. Description Relative to the Prior Art

This invention is intended to be used in large-scale public marine aquariums, such as the Boston Aquarium, Sea World of Orlando, Fla., the Seaquarium of Miami, Fla., etc. It has additional applications in other marine environments, such as lakes and oceans. As an example, some modern facilities located contiguous to a bay or harbor provide an under-water viewing area, using a wall made of plate glass or other transparent material, through which marine activity can be viewed. Furthermore, the invention is also applicable to snorkelers or scuba divers, who may carry a small, waterproof, electronic version of the invention while swimming or diving.

The invention has the object of providing information about specimens in the marine environment, such as the name, habitat, size, habits, diet, history, and other such information, hereinafter referred to as demographic information, in an improved and interactive environment. The intended audience for this invention is the visiting public attending the aquarium or other marine observation facility, divers, and viewers of activity within other types of marine environments. Viewers include those remotely connected to the marine environment, such as those connected through data communications networks, including the Internet, to cameras creating images of the environment, and the like.

Currently this type of information is commonly provided in public aquaria and marine viewing facilities in limited form by means of displays comprising posters, signs, and the like located in some proximity to the specimen to which the display relates. Often the display has the picture of a specimen, such as a fish, so that the visitor or viewer can attempt to identify the specimen by its likeness in the display. The display also may have a certain amount of statistical data about the specimen. However, the current systems of this type have a number of drawbacks:1. The specimens in the marine environment often appear very different from the pictures in the display;2. The number of such displays in a particular area are limited by the space available for such displays;3. As new specimens are added or removed (or expire), the displays need to be constantly updated;4. These display systems are often underutilized through lack of interest, difficulty in seeing the displays when the aquarium is crowded, and the requirement of reading long paragraphs of text.

A desired improvement in the prior art is the use of graphic techniques to identify particular specimens, including fish, invertebrates, etc., by first capturing a graphic image of the specimen as it appears in the marine environment, next identifying the specimen by comparing its image to a library of such images stored on the system, and then, upon identification, providing other information associated with the specimen, both graphic, textual, sonic, and otherwise, to the viewer.

To provide such a system requires the use of a number of different technologies, including graphic identification of the specimen images. A number of recent improvements in the technology provide assistance in this graphic identification requirement. In particular, the Face Recognition Machine described by Lambert in U.S. Pat. No. 5,012,522, describes a technology which may be helpful in this regard. However, the nature of the marine specimens to be so identified have characteristics which make other means of graphic identification more appropriate than the face recognition system of the Lambert patent. The variation in human faces is not very great compared to the variation in the shapes, sizes, colors, and patterns found in the marine marine environment.

Additional identification techniques involve means for effecting the separation of the image of the specimen from the background. The system is capable of analyzing images by utilizing local feature analysis, by performing an initial feature extraction which leads to image processing which consists of clustering or neural networking. These techniques are well know in the art, and are described in a recent New York Times article, page E1, May 3, 2001.

Still other means of graphic identification, utilizing colors, patterns, size variations, edge identification, etc., are used for identifying specimens in the current invention.

The current invention solves most of problems described above. In public aquaria, one or two electronic display screens, such as VDT or computer monitors, replace the multiplicity of display signs currently used. The information is conveyed to the visitors either visually, through text and pictures, through sound, or a combination of the two. And because the system utilizes an aquarium-wide network with a single database, the updating of images and information is done at a single location out of the way of the visitors and the aquarium tanks and viewing areas. This updating may be done at the convenience of the personnel doing the updating, since it does not interfere in any way with the visitors who may be viewing the displays being updated.

In other implementations, the viewing is done by the use of the personal computer, and selection and capture of the specimens of interest, as well as the software for identification and display of the demographic information relating to the specimen, may be done within the computer, or elsewhere within the data communication network.

SUMMARY OF THE INVENTION

A general object of the current invention is to provide a system for enhancing the experience of viewers of marine environments.

A specific object of this invention is to provide such a system by means of one or more viewing stations available to these viewers, each of which may be used to designate a particular specimen within the marine environment by its location and then to automatically identify the specimen and display various demographic data concerning the specimen.

According to one aspect of the invention, a system for storage, retrieval, and display of information relating to specimens in marine environments includes determining the location of a specimen under investigation (SUI) in the marine environment, indicating the location of the SUI within a field of view, and optically scanning a restricted area around the location. It also provides storing a database of specimens comprising identification information and demographic information, bulk-shape-comparing of the images, comparing color filtered images, comparing aspect-ratio filtered images, recording control fields of view without specimens, comparing fields of view with the control fields of view, spectral analysis of images, selecting a specimen of the database as a result of the comparison, and outputting the demographic information corresponding of the specimen.

According to a second aspect of the invention, the system includes one or more viewing stations, each of which includes means for the determining the location of the SUI, capturing the video image of the SUI, and displaying the demographic information corresponding to the specimen. The system also contains a computer network connected to each of the viewing stations, the computer system including means for storing a database of specimens, comparing the video image to the database, and selecting a specimen of the database.

According to a third aspect of the invention, the selecting of a specimen of the database further includes either a mouse, a track ball, a touch screen, and a joy stick, or any combination of those elements.

According to a final aspect of the invention, the outputting the demographicinformation includes either a video display terminal, audio loudspeakers, audio earphones, and printers, or any combination of those elements.

BRIEF DESCRIPTION OF DRAWINGS

These, and further features of the invention, may be better understood with reference to the accompanying specification and drawings depicting the preferred embodiment, in which.

DETAILED DESCRIPTION

Figure 1:
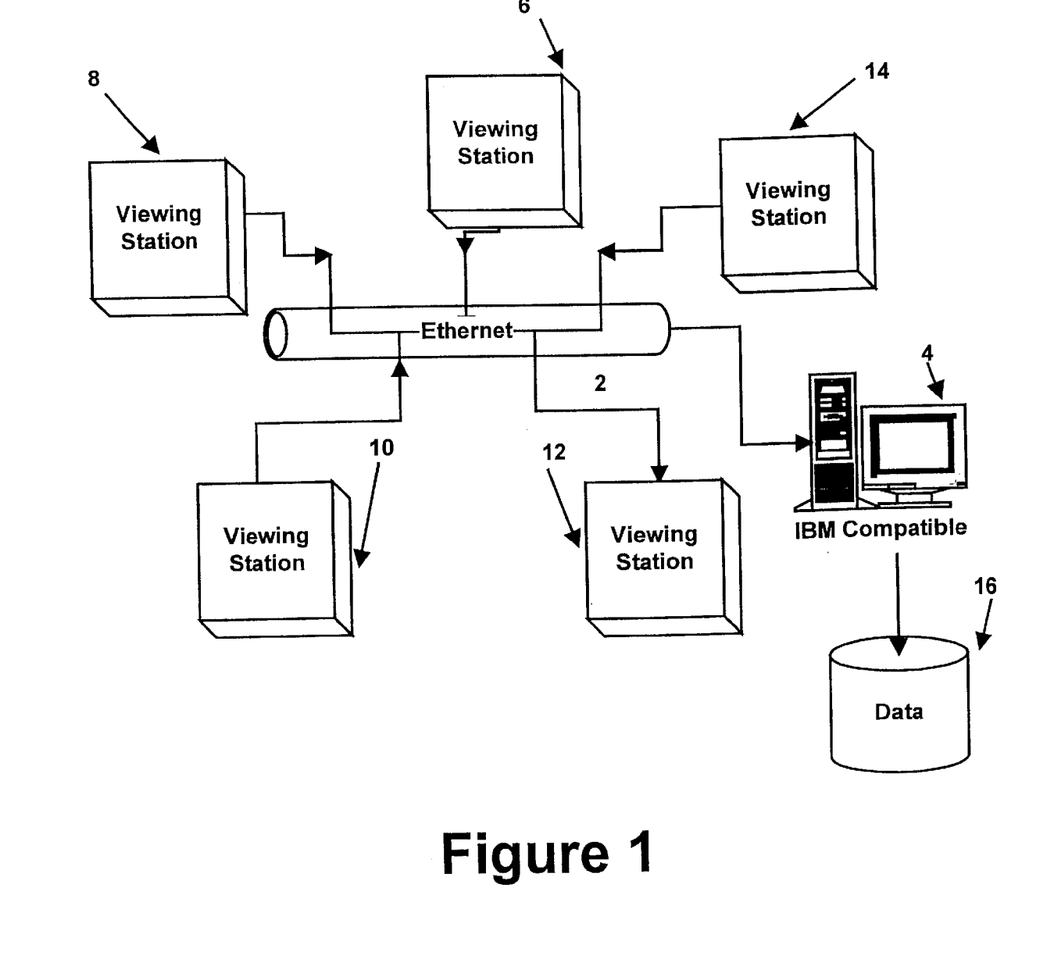
FIG. 1 depicts an overall representation of the system in block diagram form.

The preferred embodiments may be understood by first referring to FIG. 1, which depicts an overall block-diagram representation of the system. The system comprises a multiplicity of viewing stations 6, 8, 10, 12, 14, with a network server 4 maintaining the common database 16 for the system. The entire system is managed by a computer network 2. In some embodiments this computer network may be a remote data communication network, such as the Internet. It may also be variations thereof, such as Intranets, used within a restricted facility company, or other groups having particular affinities. Although FIG. 1 depicts a system with 5 viewing stations, the system may be expanded to any number of viewing stations desired.

Figure 2:
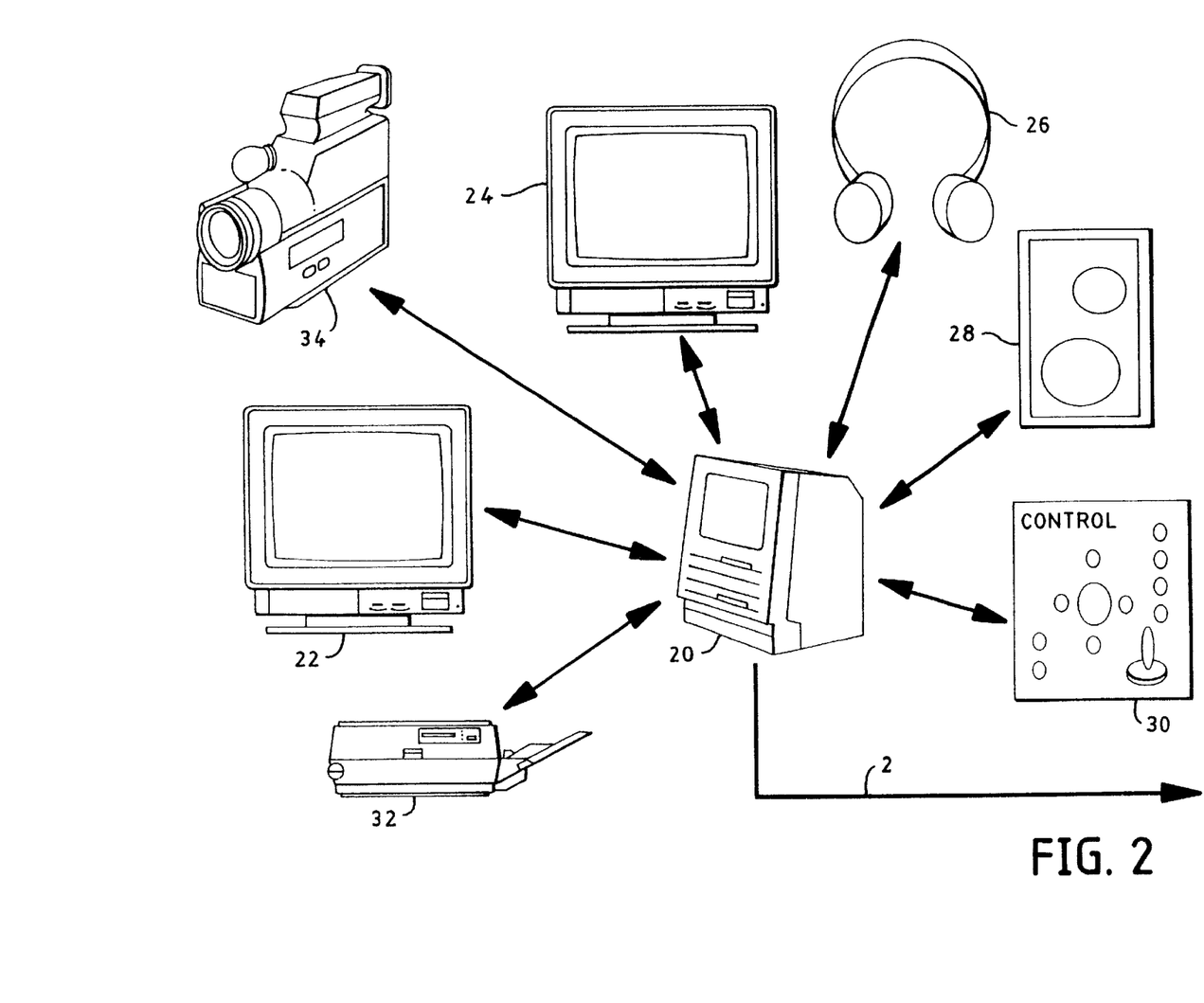
FIG. 2 depicts a typical viewing station.

A typical viewing station is shown in FIG. 2. A computer work station 20 controls the operation of the viewing station by communicating with the network server 4 ( shown in FIG. 1) via the network 2. The specimen display 24 is used to display the specimen of interest (SUI). The specimen of interest may be a fish, mammal, invertebrate, plant . . . virtually anything of interest in the aquarium. This specimen display, comprising a high-resolution color video display, may be the monitor of the workstation in alternative embodiments.

A secondary display 22 is also provided, although in some implementations a single display screen may provide the functions of both the primary and secondary displays. The secondary display provides information concerning the SUI. This information may be quite abbreviated, consisting only of the name of the specimen, its dimensions, and habitat as text only. On the other hand, the information could be quite voluminous, including graphic displays of the regions of the world where the SUI is found; the history of its discovery; views of its skeletal structure and internal organs; information about its mating habits, etc. The user has control over the information displayed in the secondary display by means of the control panel 30. The secondary display is generally menu-driven. Thus, the user can request specific types of information, or can scroll through the information as desired. Because the user has control over these screens, the user can request as much or as little information as he wants.

Also associated with each viewing station is an audio system. The audio may be either broadcast through speakers 28 located at the viewing station, or the user may use headphones 26 to avoid distracting other visitors at the aquarium. The audio may be automatically provided by voice synthesis of the text of the visual display, so that the updating of the system to provide new specimens may be minimized.

The flexibility of this system allows the information to be provided in a number of different languages. Thus, the user may select a particular language via the control panel 30. Thereafter, both the visual information shown on the secondary display and the audio output will be in the language last selected.

A key feature of the operation of this system is the ability of the user to select a specimen visible in the aquarium as the SUI. This is done by use of the video camera 34, which controllably views the entire portion of the aquarium visible from the viewing station. As part of the image processing an empty version of the field of view has been previously stored in the database, against which the field of view with specimens included can be compared. The user controls the portion of the viewing area displayed on the specimen display 24 using the control panel. The user may zoom in or zoom out to expand or reduce the field of view; he may pan left or right, or up or down, select a particular portion of the aquarium for display on the specimen display. Camera magnification is used by the system processing to assist in sized determination, in conjunction with the bulk size information contained within the database.

The video camera may be located either outside of the viewing tank, or a waterproof camera, or a sealed enclosed camera may be located inside the tank to produce a larger field of view.

Figure 3:
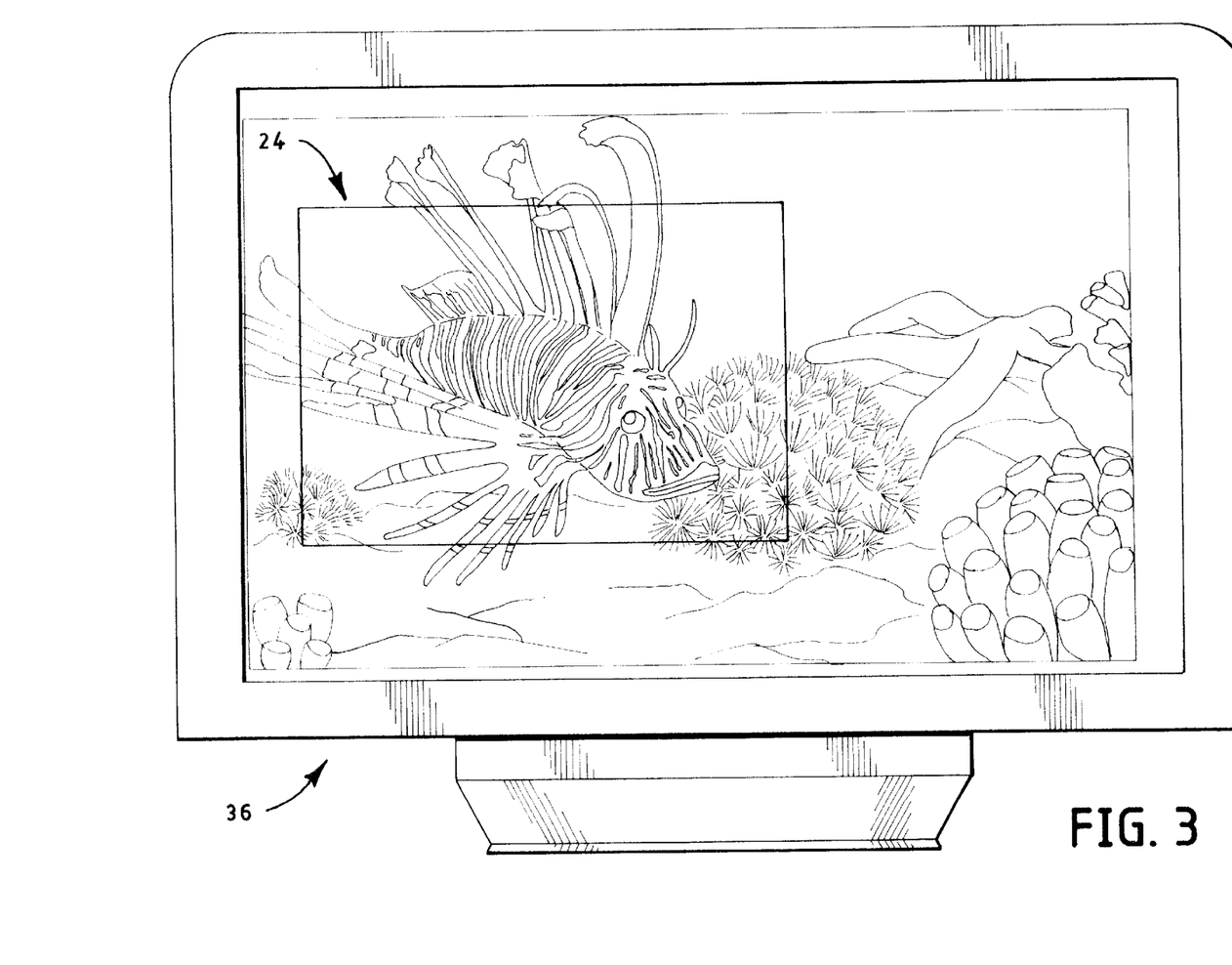
FIG. 3 depicts a specimen display, containing a specimen and cursor.

By the above method, the user may select any portion of the aquarium visible from the viewing station to display on the specimen display. This view should display the SUI (specimen of interest) with sufficient magnification so that the specimen is prominently shown on the specimen display. The user may then move a cursor, visible on the specimen display, onto the SUI, and then initiate the CAPTURE process by means of the control panel. The cursor can be of any shape, but a rectangular cursor is preferred. The size of the rectangle may be adjusted at the control panel, so that the cursor approximates the size of the SUI as it appears on the specimen display. FIG. 3 shows an example of a rectangular cursor 24 set over a specimen on the specimen display 30.

Once the CAPTURE process is initiated, the image of the SUI beneath the cursor is electronically compared to the specimens available in the data base. If the SUI is successfully identified by this electronic comparison, the corresponding information is displayed on the secondary display.

The printer 32 allows the user to print out the information contained on the secondary display, either in full or in part. It is contemplated that the user would have to pay for the printouts, via a coin operation mechanism, by purchasing a smart card, or by some similar means.

Figure 4:
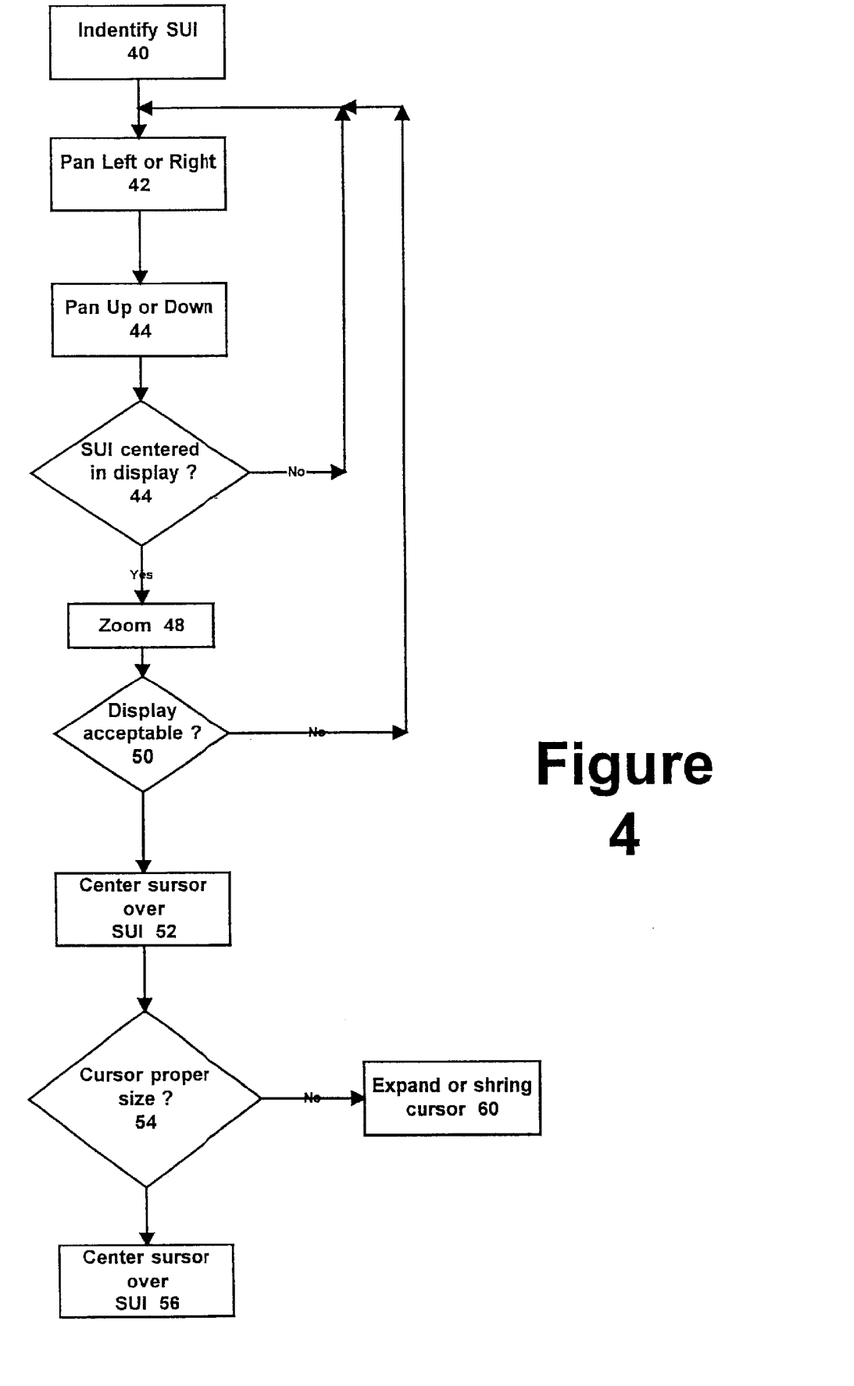
FIG. 4 depicts a flow chart of the steps taken by the user in the identification process.

FIG. 4 shows a flow chart of the steps taken by the user in this identification process. The user first identifies the SUI 40. He then pans left or right 42, and then up or down 44, and if the SUI is not in the center of the specimen display 46, he repeats the process, repeatedly if necessary. He then zooms 48 to produce a proper field of view for capture. If the SUI is not properly sized and magnified, 50, he repeats the operation, panning and zooming as necessary. When the display is acceptable for capturing, the user centers the cursor over the SUI 52. If the cursor size is not more or less the same size as the SUI 54, the user expands or shrinks the cursor accordingly 60, until the cursor size is correct. The user then initiates capture 60 by means of the control panel.

Figure 5:
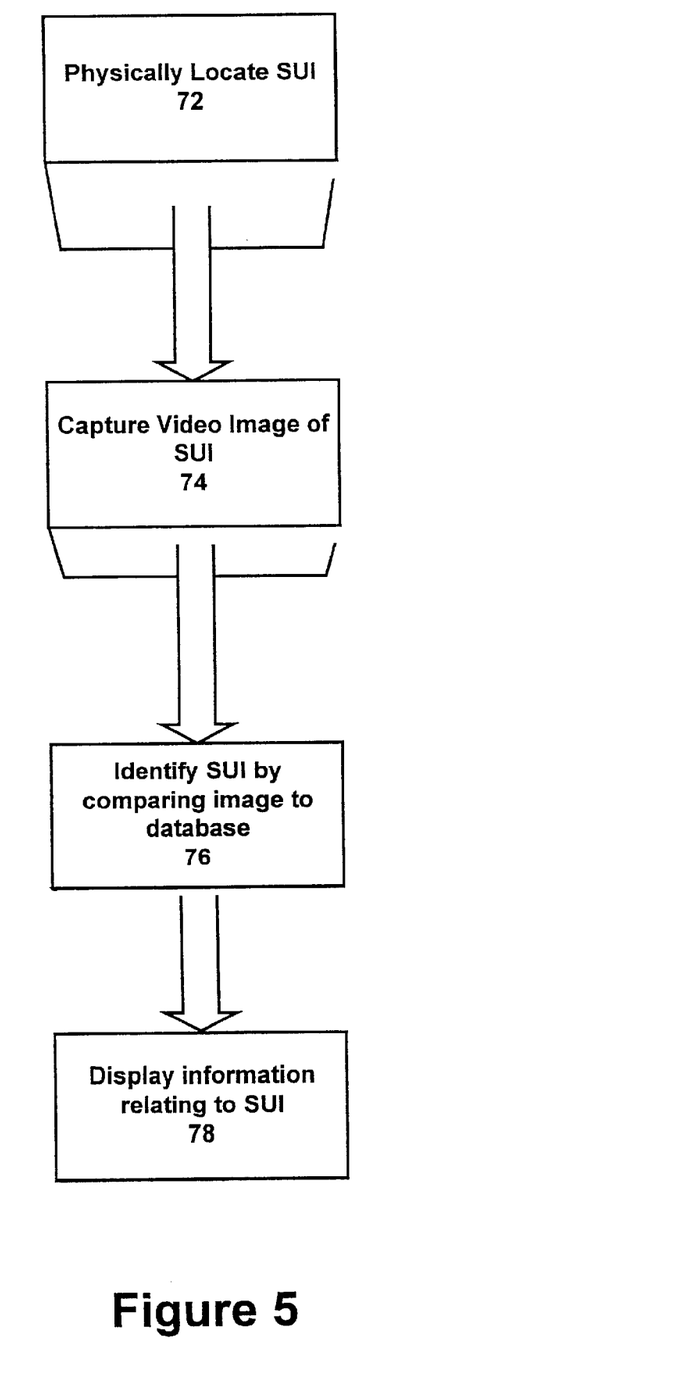
FIG. 5 depicts a block diagram showing the four basic system functions.

GENERAL SYSTEM MODEL The components of the system described above can be reduced to four basic functions, as shown in the block diagram of FIG. 5. First, the SUI is physically located within the aquarium 72. The exact three-dimensional coordinates of the SUI need not be determined; however, the location of the SUI as projected onto the plane of the viewer must be determined to a reasonable accuracy.

Next, the video image of the SUI is captured 4. That is to say, that portion of the image in the vicinity of the SUI location, as determined in step 72 above, is captured and stored for further processing. The remainder of the image may now be discarded.

Next, the captured image is compared to the images stored in the database 76. Each comparison produces a probability that the captured image corresponds to a particular image in the data base. These probabilities may indicate that the captured image is most likely a particular entry in the database; or they may show that there is a similar probability that the captured image corresponds to two or more entries in the data base.

Finally, the information corresponding to the entry or entries in the database found to correspond to the captured image is displayed 78.

FREEZE MODE The above-described operation is suitable in the case of specimens which are slow moving or stationary. For instance, corals, gorgonians, mollusks, etc. In the case of fast-moving specimens, such as dolphins or tarpon, the user may not have time to adjust the size of the display and center the SUI before the specimen is out of the field of view. The camera routinely records multiple images in order to determine the shape boundaries of fast-moving specimens. In such cases, the user will utilize the Freeze Mode system operation.

In Freeze Mode, the user sets the zoom parameters appropriately, and pans the field of view, thus selecting a field of view, at a particular magnification, which the user anticipates will soon be entered by the specimen of interest. The user then waits for the specimen to appear.

When the specimen does appear, the user activates the Freeze Mode control on the control panel. At the instant the control is activated, a high-resolution image is made of the field of view previously selected. This stationary image is then displayed upon the specimen display. The user may then use the process depicted in FIG. 4 to capture the SUI for identification.

Alternative Means of Physical Location of the SUI An alternative means of physically locating the SUI involves the use of a so-called three-dimensional mouse. This type of mouse is described in U.S. Pat. No. 5,598,187 entitled SPATIAL MOTION PATTERN INPUT SYSTEM AND INPUT METHOD, issued to Ide et al.

This alternative will be called the mouse system hereinafter. In operation the three-dimensional mouse is simply pointed at a target, and the three-dimensional attitude of the mouse is transmitted from the mouse to a receiver. Internal gyroscopes continuously measure the changes in pitch, roll, and yaw of the mouse, so that once the mouse is calibrated, it can then determine its exact attitude with respect to its attitude when calibrated.

For use with the current invention the three-dimensional mouse would be used in conjunction with a laser-pointer rigidly attached to the mouse. The user would operate the system by fixing the laser spot produced by the laser pointer on the SUI. The user would then depress the CAPTURE button located on the mouse, and the coordinates of the SUI would be transmitted to the viewing station computer 20.

In practice the use of this mouse system has a number of advantages over the previously-described capture method. First of all, the user need not continually look back and forth between the aquarium and the specimen screen; secondly, fewer operations are required in the mouse system than in the previous approach. The previous approach requires the user to slew the field of view, zoom in, locate the cursor of the SUI, and expand or contract the cursor to fit the SUI. The mouse system, on the other hand, is a simple point and click system.

A still further method of specimen identification, or "pointing", utilizes Touch Screen technology. The user may interface with the computer system by touching the screen for both identifying the location of the SUI within the field of view, and for command execution. For SUI identification, the display screen contains a cursor in the form of a box, or frame, which can be dragged around the screen by a user who first touches the screen within the cursor, and then slides his finger to to the location of the specific SUI, thus moving the cursor along under his finger. This technique also provides, as an alternative, means for designating the SUI directly on the screen by touching the image of the SUI on the screen.

Identification of the SUI A number of different techniques are used to identify the SUI once the image of the SUI has been captured.

It should first be acknowledged that the problem of graphically identifying marine specimens, particularly fish swimming freely, provides a more complicated problem than the automatic identification of human faces. The main difference is that the marine specimens present a much different view from different angles. Not only the shape, but the coloration and markings of a typical fish are vastly different when seen from different aspects.

As a result, the database contains, for each specimen, a number of different graphic representations, which correspond to what is seen when the specimen is observed from different viewing angles.

The first step in the identification of the specimen is therefore a comparison between the captured image and the images of the database. There are a number of well-known techniques for this identification. One such technique uses two-dimensional Fourier transforms. The Fourier transform of the captured image is calculated. The Fourier transforms of the database may be pre-calculated from the images, and stored in the library. A statistical correlation coefficient is produced between the Fourier transform of the captured image and that of the each image in the database. When the correlation coefficient is high, there is a high probability that the two images represent the same specimen.

Another technique utilizes two-dimensional vectors called gestalts. The theory for this techniques was developed by Robert Russell and Richard Routh of the Air Force Institute of Technology in 1985, and a instrument called the Face Recognition Machine was developed from this technology. A further development of this technique was described by Laurence C. Lambert in U.S. Pat. No. 5,012,522 entitled Autonomous Face Recognition Machine. A more recent approach is described by Turk et al. In U.S. Pat. No. 5,164,992 entitled Face Recognition System. This invention describes the pattern to be recognized by a set of eigenvectors in a multi-dimensional image space.

Because marine specimens are brightly colored, additional recognition techniques used include the use of color filters in conjunction with other pattern recognition techniques. The images to be detected would be first subjected to a number of discrete color filters. Pattern recognition would then be applied to the image after it was filtered by a particular color filter.

Whatever pattern-recognition technique is chosen, the current system first uses a bulk shape attribute comparison to pre-select those images of the database which merit further analysis. This bulk shape test compares the SUI to the specimens in the database on the basis of rough size and shape on a gross level, so that the subsequent tests can proceed faster, having a smaller number of comparisons to make. Next, the system makes a fine shape comparison based on the aspect ration of the SUI (the comparison of height to width), the presence or absence of sharp edges or projections, etc., thereby further excluding other members of the database. The images which remain after the bulk shape tests are then subjected to more powerful pattern-recognition tests.

A further refinement of the shape identification technique uses background cancellation, whereby the field of view, without specimens, is recorded and stored for later use. The of a specimen may be then facilitated by comparison to the stored background image.

A still further method of image identification includes Edge Recognition technology, which consists of algorithms which allow an images edge to be identified and separated from the background of an image. This allows a computer system performing image analysis such as in the first steps of this systems analysis to accurately identify the edges or outline of the image (SUI) to be analyzed. This marine life identification system may utilize this existing technology as part of its initial identification in order to enhance the ease of user interface as outlined above. In systems using a touch screen as a pointing device, a user would touch the image of the SUI on the screen and the system would proceed with the Edge Recognition. Once this has been completed it would proceed with the system identification algorithms previously outlined, providing aid in extracting the image of the fish from the background is well known, and is described at various URLS on the INTERNET.

A still further means of image identification incorporates "Feature Extraction". This technique is capable of analyzing images by utilizing local feature analysis, by performing an initial feature extraction which leads to image processing which consists of clustering or neural networking. The database needed for this method of analysis consists of vector features for each SUI. Feature Extraction is a well known technique, and is described in a NY Times Article, page E1, dated May 3, 2001, which is incorporated herein by reference.

Image depth perception as required for image analysis may be obtained by utilizing a laser light system, or utilizing two or more cameras pointed at the SUI slightly offset from each in order to provide a stereoscopic effect for giving the image depth to aid in the processing.

Finally, the identification of moving specimens may be enhanced by successive recordings of the field of view, revealing the motion of the specimen by its changing position in the successive images.

Figure 6:
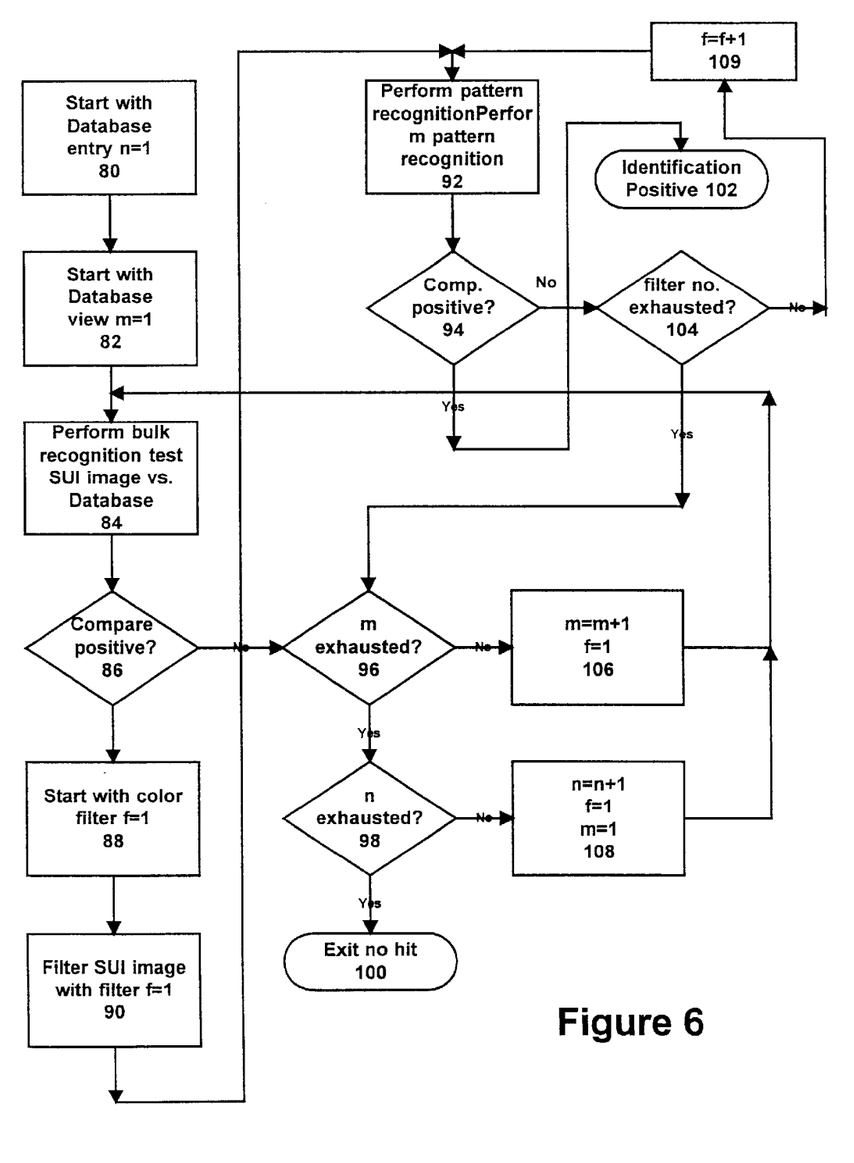
FIG. 6 depicts a flow chart describing the operation of the identification mechanism.

FIG. 6 depicts the operation of the identification mechanism. The index n representing the index number of the specimen in the data base is first initialized 80. Then the view number index is initialized 82 as well. There are a number of views associated with each specimen: top, bottom, side, rear, etc., and each of these views contains a subset of image information. Then a bulk recognition test is performed 84 comparing the SUI to the images in the database. The bulk recognition test compares the overall ratios of the image: length to width, etc. to those of the database. There is bulk recognition information corresponding to each view of the database image corresponding to index number n, and all are tested.

If the SUI passes the bulk recognition test, then the filter index f is initialized 88 and the SUI is modified by passing through filter f 90. The pattern recognition test 92 is then performed, comparing the filtered SUI to the database entry. If this comparison is positive, then the SUI has been identified 102.

If the SUI fails the comparison test 86, then if the filter index is not yet exhausted 104, the filter index f is incremented 109, and the pattern recognition performed with the next filter 92. Otherwise, the system tests the view number 96, and if the view number has not been exhausted for this specimen the filter number is re-initialized, and the view number is incremented 106, and the bulk test performed 84. If the view number is exhausted the system tests the specimen number 98. If the specimen number has been exhausted, then the identification process fails and terminates 100. Otherwise, the view number and filter number are re-initialized and the specimen number is incremented 108. Then the next bulk test is performed 84.

The process is repeated until the entire database has been tested, or until there is a positive identification of the SUI.

Figure 9:
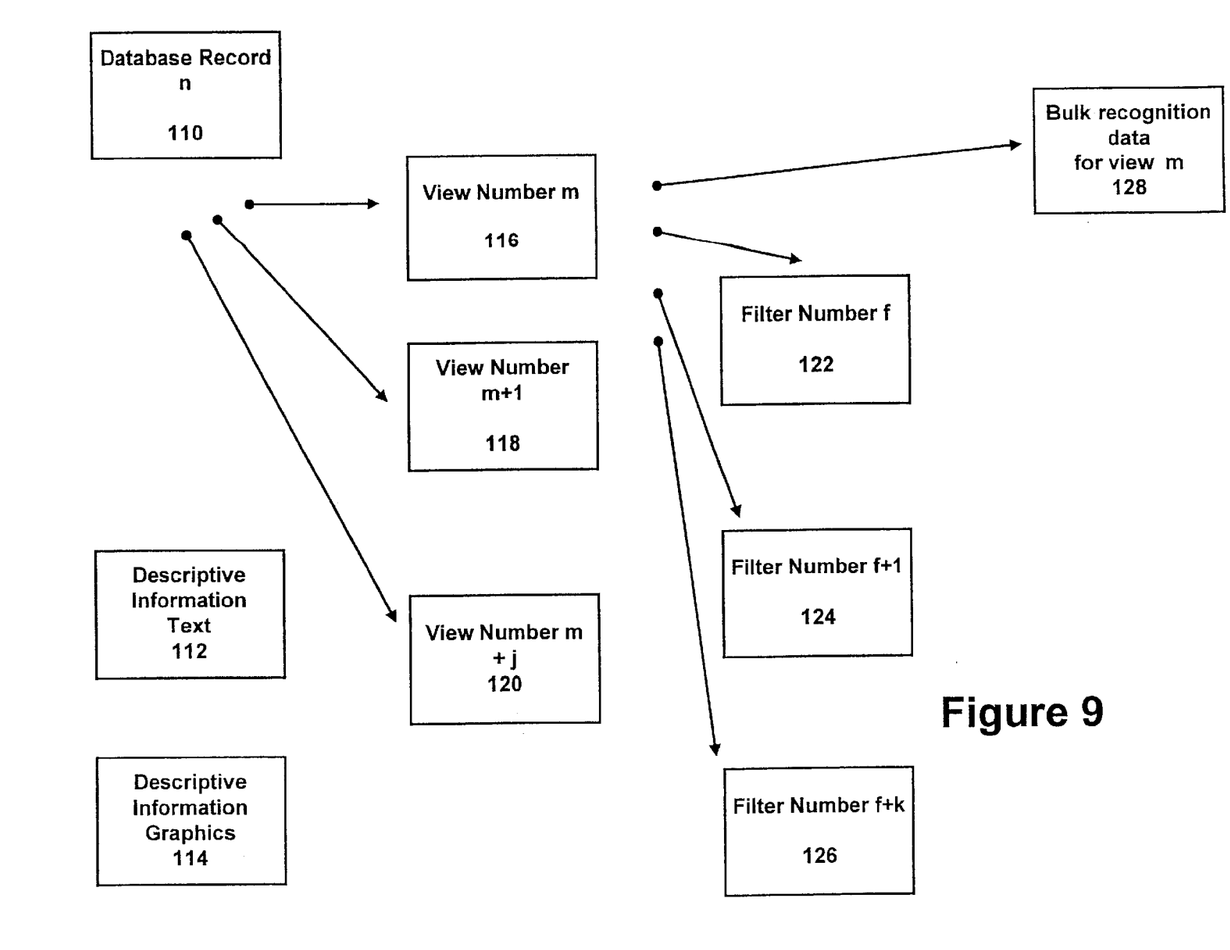
FIG. 9 depicts the structure of the database used by the system.

Structure of the database The database is a linked file structure which is configured according to the structure of FIG. 9.

FIG. 9 shows a single record 110 of the database, designated here as record number n.

The database contains one such record for each such specimen in the database.

Within this nth record are subrecords corresponding to different view of the specimen. FIG. 9 shows view m 116, although subrecords corresponding to the other view numbers will also be present in this record. Also part of this record are subrecords m+1, m+2, etc. until m+j.

Corresponding to each view is a set of sub-records, one such subrecord corresponding each particular filter number. FIG. 9 shows the data for filter number f 122, which corresponds to view m of database record n. This data will contain the pattern recognition information, whether Fourier transform spectra, eigenvectors, or the like, depending upon the exact mechanism of pattern recognition are selected for the overall design. Whichever system is used, it will involve some form of spectral analysis. Also associated with view m are all the other filter data, represented as subrecords f+1, f+2, etc. until f+k, where there are k+1 filter subrecords associated with each view.

There is also bulk recognition data associated with each view. Thus, the bulk-recognition data 128 also appears as a subrecord of the database record n.

Figure 7:
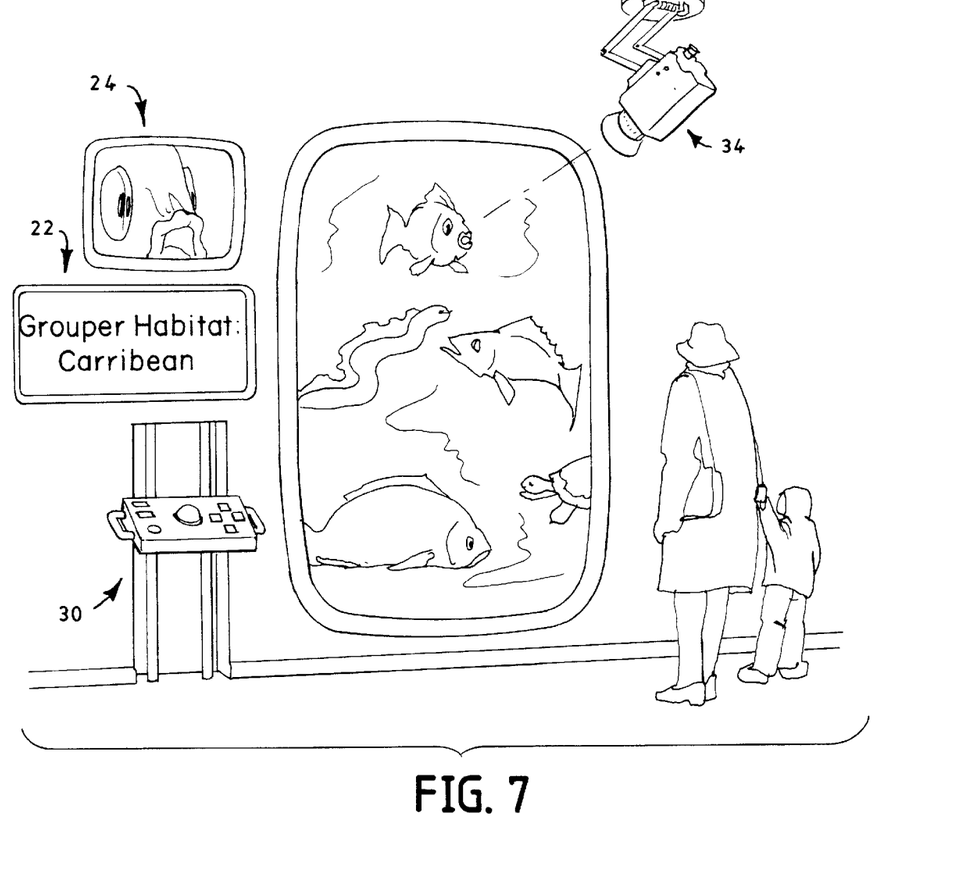
FIG. 7 depicts the configuration of a typical viewing station.

Typical Viewing Station Configuration FIG. 7 shows the configuration of a typical viewing station. The specimen display 24 is set above the secondary display 22, which displays textual data about the SUI. The control panel 30 is shown mounted on slides to be accessible to a wide variety of viewers of different heights. The TV camera 84 is mounted above the viewing window, so as not to obstruct the view of the visitors.

Figure 8:
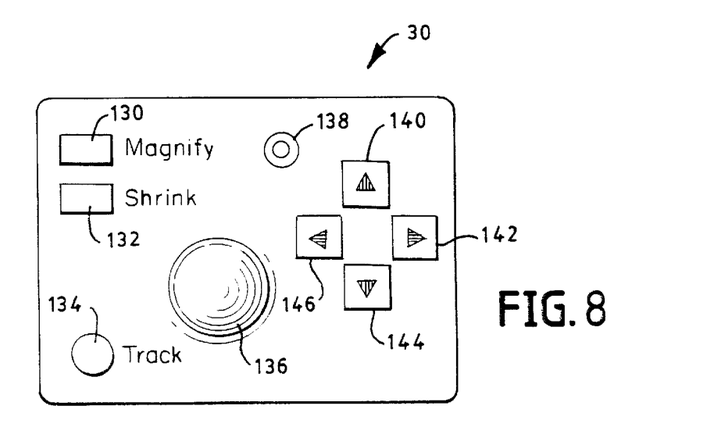
FIG. 8 depicts the system control panel.

In FIG. 8, the control panel 30, is shown here as containing a number of switches and buttons, as well as a track ball 136. The track ball is used to pan the camera to different points in the aquarium. The buttons 140 and 144 move the cursor up and down, while buttons 142 and 146 move the cursor left and right. Magnify and shrink buttons 130 and 132 cause the image in the specimen display 24 to grow and shrink in size. The other button, 134, is used to capture the image. Jack 138 is available for the user to insert the plug of a pair of headphones to utilize the audio capabilities of the station.

Other types of control screens are possible. Other embodiments may use menu-driven touch screens, which contain all the functions previously described in appropriate form.

CALIBRATION Calibration of the system database include use of a standard target for illumination. The system is be initially trained in the absence of any background, with SUI only visible within the field of view. Next, a calibration target appears in the actual environment, allowing the system to retrain itself for the actual environment conditions, including light, camera angle, and camera quality. The objective of this retraining is to be able to zero out the effect of the environment in the identification process. Once a system has identified correctly the SUI, a calibration operator allows the system to further calibrate itself or train itself to the exact characteristics of the actual SUI in the operating environment thus increasing identification accuracy.

OTHER MARINE ENVIRONMENTS WITH IMAGING, AND INTERNET COMMUNICATION The current invention is applicable to marine environments other than public aquaria. It is clearly applicable to private aquaria of various sizes and configurations. Many privately owned facilities rival public aquaria in both size, and in the quality of the specimens and environment.

In additional to traditional aquaria, in which the environments are enclosed within tanks holding the specimens, another modern approach is to construct facilities which border upon existing marine environments so that visitors can view the specimens in their natural surroundings. Such natural marine environments are often viewed through transparent walls which border on an ocean or lake, as well as enclosed tanks. Other approaches include the building of transparent tunnels on the sea beds of oceans or lakes, in which visitors may walk, observing the sea life in its natural surroundings.

In addition to facilities which allow visitors to be present at the boundaries between sea and land environments, modern technology allows the use of remote viewing devices, such as cameras, WEB cams, and other electronic imaging devices to observe marine life and transmit images to remote viewers. These cameras may either be located at the land sea interface, such as the transparent walls bordering on the marine environment, or may be immersed within the marine environment itself.

For instance, the New England Aquarium®, in Boston, Mass., has a webcam in its Giant Ocean Tank which broadcasts to the Discovery Channel® website, at http://dsc.discovery.com/cams/sharkvideo.htm. The Waikiki Aquarium® has a webcam in their Shark Tank which broadcasts to the Animal Planet Channel® website and public schools, which may be seen at their website, http://waquarium.mic.hawaii.edu/coralcam/. And as a third example, Caribbean Web Cam® has a camera underwater at the Bonaire Marine Park®, which broadcasts over the Internet at www.bonairereefcam.com. The presence of electronic imaging devices in existing marine environments, combined with access through the internet, provides a perfect framework for incorporation of the systems and methods described herein.

USE OF THE INVENTION BY DIVERS One final setting for the current invention is its use by snorkelers and divers, who enter a marine environment for the purpose of viewing marine life, and other specimens. An embodiment for use by such snorkelers and divers is in the form of a hand-held piece of electronic gear having a built-in camera or other imaging sub-system, data entry, dataprocessing, storage, and display capabilities. In such a system, the diver may be close enough to the specimen so that pointing a view finder, such as that used in common cameras for framing a picture, will be sufficient to locate the specimen within the field of view, and no mouse, track ball, or other such pointing device will be necessary. A zoom feature is also provided for improved specimen location within the field of view. In one such embodiment, the hand-held device is self contained, with the database containing the specimen information pre-loaded into the device's storage, conforming to the general geographic are of the dive. In a second variation, the hand-held device contains data communication capability, so that the bulk of the data processing can be accomplished at a remote location, and the results communicated back to the hand-held device, where it is viewed by the diver on the device's viewing screen.

While the invention has been described with reference to specific embodiments, it will be apparent that improvements and modifications may be made within the purview of the invention without departing from the scope of the invention defined in the appended claims.

What is claimed is:

1. A system for storage, retrieval, and display of information relating to specimens in marine environments comprising:

means for determining the location of a specimen under investigation (SUI) in the marine environment;

means for indicating the location of the SUI within a field of view;

means for optically scanning a restricted area around said location;

means for storing a database of specimens comprising identification information and demographic information;

means for bulk-shape-comparing of the images;

means for comparing color filtered images;

means for comparing aspect-ratio filtered images;

means for recording control fields of view without specimens;

means for comparing fields of view with the control fields of view;

means for spectral analysis of images;

means for selecting a specimen of the database as a result of said comparison; and means for outputting the demographic information corresponding of the specimen.

2. The system of claim 1, further comprising:

one or more viewing stations, each of which comprises:

said means for determining the location of the SUI;

said means for capturing the video image of the SUI; and means for displaying the demographic information corresponding of the specimen, and a computer network connected to each of the viewing stations, and comprising:

said means for storing a database of specimens;

said means for comparing the video image to the database; and said means for selecting a specimen of the database.

3. The system of claim 2, wherein the means for selecting a specimen of the database further comprises one or more members selected from the group consisting of a mouse, a track ball, a touch screen, and a joy stick.

4. The system of claim 3, whereby the means for outputting the demographic information comprises one or more means selected from the group which consists of:

video display terminal displays; audio loudspeakers; audio earphones; and printers.

5. A method for storage, retrieval and display of information relating to specimens in marine environments, comprising:

determining the location of a specimen under investigation (SUI) in the marine environment indicating the location of the SUI within a field of view;

optically scanning a restricted area around said location;

storing a database of specimens comprising identification information and demographic information;

bulk-shape-comparing of the images;

comparing color filtered images;

comparing aspect-ratio filtered images;

recording control fields of view without specimens;

comparing fields of view with the control fields of view;

spectral analyzing of images selecting a specimen of the database as a result of said comparison; and outputting the demographic information corresponding of the specimen.

6. The method of claim 5, whereby the indicating the location of the SUI comprises using a means selected from the group consisting of a mouse, a track ball, a touch screen, and a joy stick.

7. The method of claim 6, whereby the outputting the demographic information comprises using one or more means selected from the group which consists of:

video display terminal displays;

audio loudspeakers;

audio earphones; and printers.

* * * * *